(12) United States Patent
Valoppi et al.

(10) Patent No.: US 12,256,766 B2
(45) Date of Patent: Mar. 25, 2025

(54) METHOD TO PRODUCE OLEOGELS

(71) Applicant: Helsingin yliopisto, Helsingin yliopisto (FI)

(72) Inventors: Fabio Valoppi, Helsinki (FI); Ari Salmi, Helsinki (FI); Edward Haeggström, Helsinki (FI)

(73) Assignee: HELSINGIN YLIOPISTO, Helsingin Yliopisto (FI)

( * ) Notice: Subject to any disclaimer, the term of this patent is extended or adjusted under 35 U.S.C. 154(b) by 809 days.

(21) Appl. No.: 16/672,658

(22) Filed: Nov. 4, 2019

(65) Prior Publication Data
US 2021/0127720 A1 May 6, 2021

(51) Int. Cl.
| | |
|---|---|
| A23L 5/30 | (2016.01) |
| A23D 9/007 | (2006.01) |
| A23L 29/00 | (2016.01) |
| A23L 29/20 | (2016.01) |

(52) U.S. Cl.
CPC ................. *A23L 5/32* (2016.08); *A23D 9/007* (2013.01); *A23L 29/04* (2016.08); *A23L 29/20* (2016.08); *A23V 2002/00* (2013.01)

(58) Field of Classification Search
CPC . A23L 5/32; A23L 29/04; A23L 29/20; A23D 9/007; A23D 9/013; A23D 9/04; A23V 2002/00
USPC .......................................................... 426/238
See application file for complete search history.

(56) References Cited

U.S. PATENT DOCUMENTS

| | | | |
|---|---|---|---|
| 2002/0031577 A1* | 3/2002 | Arends | .................. A61K 8/922 426/601 |
| 2015/0157038 A1* | 6/2015 | Ergun | .................... A23G 1/305 426/573 |

OTHER PUBLICATIONS

NPL Masouleh et al. (in Proceedings of the 4th Iranian International NDT Conference Feb. 26-27, 2017, Olympic Hotel, Tehran, Iran ). (Year: 2017).*
Google search for Finite Element Method (FEM) [Retrieved NPL Masouleh et al. as detailed above). (Year: 2022).*

* cited by examiner

*Primary Examiner* — Bhaskar Mukhopadhyay
(74) *Attorney, Agent, or Firm* — NIXON & VANDERHYE (57) ABSTRACT

Disclosed is a method for producing oleogels by sonicating a mixture including an oleogelator component and an oil component with ultrasound including superpositioned ultrasound waves while cooling the mixture from a temperature wherein the mixture is in molten state to a temperature wherein the oleogelator component of the mixture is at least partially in solid state. The method produces oleogels of improved stability.

10 Claims, 5 Drawing Sheets

METHOD TO PRODUCE OLEOGELS

FIELD

The present invention relates to methods for producing oleogels, in particular to methods wherein oleogelator components are subjected to superposed ultrasound waves.

BACKGROUND

Excessive fat consumption in the diet correlates with obesity that in turn may cause e.g. cardiovascular diseases, metabolic syndrome, and type 2 diabetes. Obesity is a global problem. Lowering the intake of saturated fats can help reduce obesity outbreaks, may improve well-being, productivity, and may reduce healthcare costs. However, direct substitution of saturated fats with healthier liquid oils rich in unsaturated and polyunsaturated lipids is not possible because the crystalline network formed by saturated fats that provide texture and structure to fat-rich products, is lost.

Oleogels (a.k.a. organogels) are lipid-based materials that contain 85-99.5% of liquid oil whereas the rest is structuring molecules called oleogelators. Methods exist to prepare oleogels. Indirect methods are foam-, emulsion-, solvent-exchange-, and aerogel-templated methods where proteins or polysaccharides are used to prepare the scaffold in which oil is absorbed/retained. Direct methods use crystalline molecules, e.g. monoglycerides, fatty alcohols, waxes, etc. to directly gel the oil. Among oleogelation methods, the direct one is most explored since it is simple, it needs no specific equipment, it requires little energy during oleogel preparation, and it is industrially scalable. The method first disperses the structuring agent into the oil, and then employs a heating and a cooling step. The oleogelators used in this method rearrange themselves during cooling to form a crystalline network. This network entraps the oil and gels the system. Despite the potential and convenience of oleogels produced with the direct method, their applicability as saturated fat replacers is challenged by their storage instability: the oleogelator crystal network undergoes modification induced by molecular rearrangements (e.g. polymorphic transformation), which alters the mechanical properties of the oleogel and its ability to retain oil.

Oleogels were introduced to substitute saturated fats without jeopardizing the final structure of food products. However, oleogels have insufficient stability during storage. The storage instability impedes these materials from becoming the "fat of the future". Much effort has been directed to improve oleogel performance. Regarding processing, cooling rate and shear forces were used to improve the ability of oleogels to retain oil. Shear forces were applied with mechanical devices and high-intensity ultrasound (HIU). In systems containing saturated fat, application of shear during crystallization aligns the crystals which decreases oil migration rate thanks to the more tightly packed crystal network (increased tortuosity of the system). This makes the systems more stable. However, applying shear forces to oleogels often reduce their ability to retain oil because small crystals and few junction zones among crystals are formed. Recently, HIU (high power acoustic/ultrasonic) was used to tailor the mechanical and functional properties of saturated fats and oleogels. Unfortunately, HIU due to transient cavitation creates streaming and particle fractionation effects which leads to uncontrolled modification of the oleogelator crystalline network. Moreover, the high energy output of the sonotrode may create free radicals, leading to off flavors and potentially toxic reaction products and thus to oleogels with reduced healthy properties.

Accordingly, there is a need for a method for producing oleogels with increased stability.

SUMMARY

It was observed that to obtain oleogels with enhanced stability it is necessary to carefully control the forming crystalline network without inducing adverse effects. These adverse effects could be avoided by sonicating the oleogels with superpositioned ultrasound waves. The advantage of using such waves relies on their ability to finely and precisely control the structure of the system during sonication. Such control is not attainable using the state-of-the-art technology used to tailor oleogel and fat structures.

According to one aspect the present invention concerns a method for producing oleogel, the method comprising
  providing a mixture comprising an oleogelator component and an oil component, and
  sonicating the mixture with ultrasound while cooling the mixture from a first temperature wherein the mixture is in molten state to a second temperature wherein the oleogelator component in the mixture is at least partially in solid state,
  wherein the ultrasound comprises one or more superpositions of ultrasound waves.

According to another aspect the present invention concerns a method for producing oleogel, the method comprising
  providing a system comprising
    a chamber,
    a first transducing means, and
    a second transducing means, or an acoustic impedance contrast means,
  transferring a mixture comprising an oleogelator component and an oil component to the chamber,
  cooling the mixture from a first temperature wherein the mixture is in molten state to a second temperature wherein the oleogelator component in the mixture is at least partially in solid state and
  the first transducing means and/or the second transducing means emitting ultrasound comprising one or more superpositions of ultrasound waves for sonicating the mixture in the chamber.

According to still another aspect the present invention concerns a method for producing oleogel, the method comprising
  providing a system comprising
    a chamber comprising an inlet and an outlet,
    a first transducing means,
    a second transducing means, or an acoustic impedance contrast means,
  transferring a mixture comprising an oleogelator component and an oil component to the chamber via the inlet,
  cooling the mixture from a first temperature wherein the mixture is in molten state to a second temperature wherein the oleogelator component in the mixture is at least partially in solid state,
  the first transducing means and/or the second transducing means emitting ultrasound comprising one or more superpositions of ultrasound waves for sonicating the mixture in the chamber, and
  passing the mixture at the second temperature from the chamber via the outlet.

According to another aspect the present invention concerns an oleogel obtainable by the method of claim 1.

According to still another aspect the present invention concerns a food composition comprising oleogel obtainable by the method of claim 1.

According to still another aspect the present invention concerns a method for increasing stability of the oleogel with an ultrasound field comprising one or more superpositions of ultrasound waves.

Exemplifying and non-limiting embodiments of the invention, both as to constructions and to methods of operation, together with additional objects and advantages thereof, are best understood from the following description of specific and exemplifying embodiments when read in connection with the accompanying drawings.

The verbs "to comprise" and "to include" are used in this document as open limitations that neither exclude nor require the existence of unrecited features. The features recited in the accompanied depending claims are mutually freely combinable unless otherwise explicitly stated. Furthermore, it is to be understood that the use of "a" or "an", i.e. a singular form, throughout this document does not exclude a plurality.

DESCRIPTION

Figure 1:
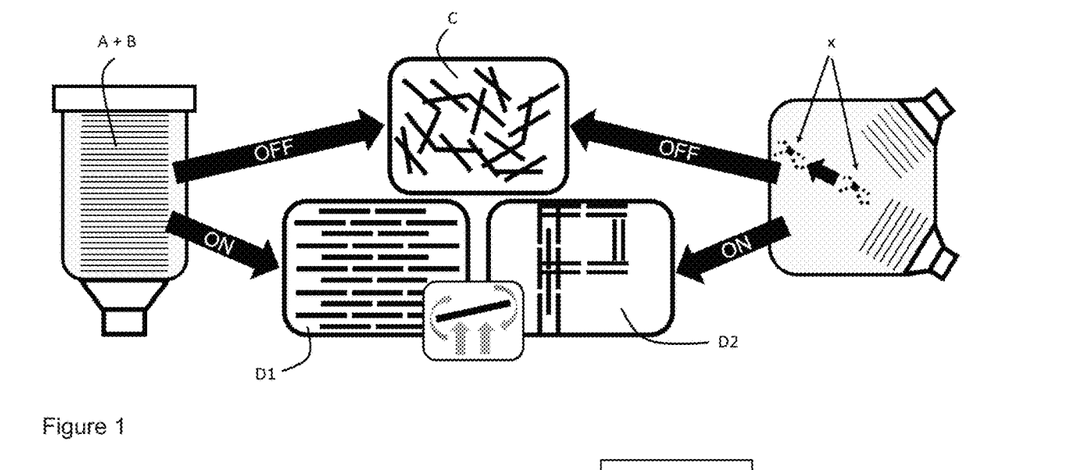
FIG. 1 shows the principle of the method of the present invention.

The principle of the present invention is presented in FIG. 1. When a molten mixture comprising an oleogelator component (A) and an oil component (B) is allowed to cool until solidification, crystallization of the oleogelator component is initiated, and randomly oriented crystals of the oleogelator component are formed (C). However, when the process is performed in the presence of an ultrasound field comprising a one or more superpositions of ultrasound waves, oriented crystals of the oleogelator component are formed (D1, D2). It was observed that such orientation of the crystals improves oleogel stability. The enhanced stability was not observed when high intensity ultrasound (HIUS) was used. Planar standing fields can organize oleogelator crystals in planes (D1). More complex shapes of the sonic field can be generated by time varying superpositions that create movable interaction points. The shapes denoted with symbol on right hand side of the figure are node points of the sound field. These node points that can be positioned in the volume at will exert torque/translatory force on the forming oleogel crystal and as a results produce not only a crystallized plane but a calligraphic pattern of crystallized oleogel (D2).

As defined herein an oleogel is stable when
  the crystalline structure does not undergo polymorphic transformation,
  the crystalline network does not change over time so that it still retains the oil inside the oleogel and the mechanical properties (i.e. firmness) do not change over time, and
  the oil does not oxidize.

Figure 2:
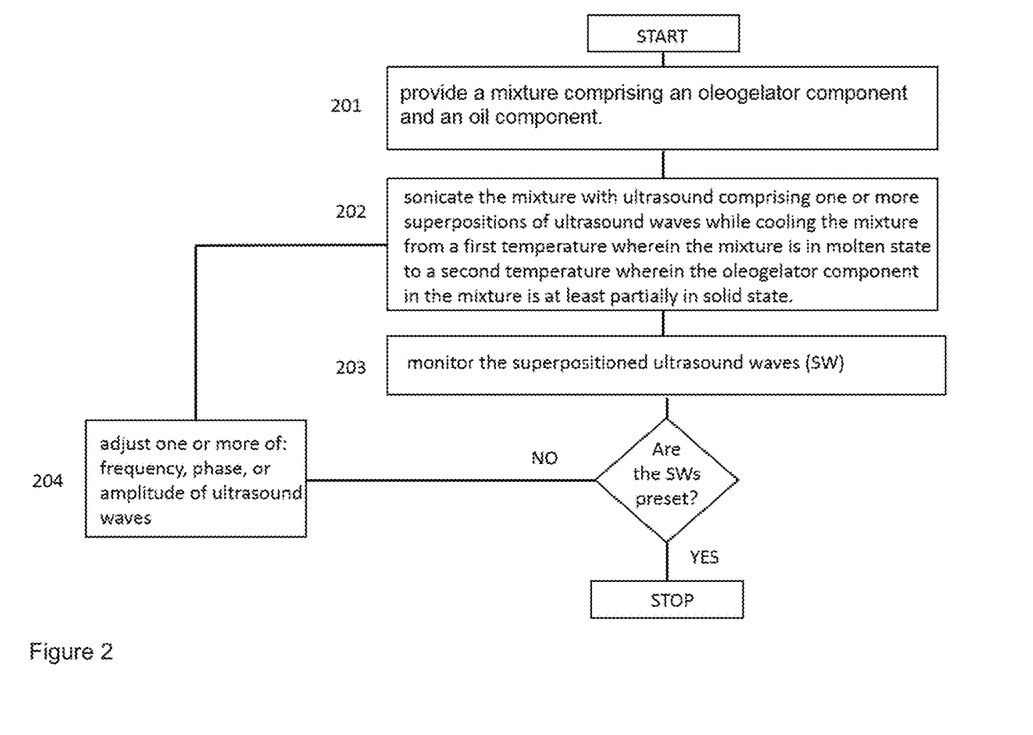
FIG. 2 shows a flowchart of an exemplary non-limited embodiment of the method of the present invention.

A flowchart of an exemplary and non-limiting embodiment of the method for producing oleogels is shown in FIG. 2. According to this embodiment the method comprises the following actions:
  action 201: provide a mixture comprising an oleogelator component and an oil component.
  action 202: sonicate the mixture with ultrasound comprising one or more superpositions of ultrasound waves while cooling the mixture from a first temperature wherein the mixture is in molten state to a second temperature wherein the oleogelator component in the mixture is at least partially in solid state.

According to the method, the mixture is cooled from a first temperature wherein the mixture is in molten state to a second temperature wherein the oleogelator component in the mixture is at least partially in solid state, preferably as crystals. It is obvious for a skilled person that the first temperature and the second temperature depend on the oil component and on the oleogelator component as well as on the mole fraction of the oil component and the oleogelator component in the mixture.

In order to avoid cavitation the frequency of the ultrasound is preferably 0.5-20 MHz. This is in strict contrast to HIUS that relies on cavitation: sufficient cavitation in HIUS has been achieved by operating it in the kHz domain.

The intensity of the ultrasound in the method of the present invention is typically 0.001-10 W cm$^{-2}$.

According to an exemplary embodiment the oil component of the oleogel is selected from a group consisting of soybean oil, canola oil, corn oil, sunflower oil, safflower oil, flaxseed oil, almond oil, peanut oil, fish oil, algal oil, palm oil, palm stearin, palm olein, palm kernel oil, high oleic soybean/canola/sunflower/safflower oils, hydrogenated palm kernel oil, hydrogenated palm stearin, fully hydrogenated soybean/canola/cottonseed oils, high stearic sunflower oil, enzymatically and chemically inter-esterified oils, butter oil, cocoa butter, avocado oil, almond oil, coconut oil, cottonseed oil, mineral oil, silicon oil, fluorinated oil, and mixtures thereof.

According to an exemplary embodiment the oleogelator component of the oleogel is selected from a group consisting of saturated monoglyceride, polyoxyethylene sorbitan monooleate, polyoxyethylene sorbitan monostearate, sorbitan monooleate (SMO), sorbitan monostearate (SMS), glyceryl monooleate (GMO), glyceryl monostearate (GMS), glyceryl monopalmitate (GMP), polyglyceryl ester of lauric acid-polyglyceryl polylaurate (PGPL), polyglyceryl ester of stearic acid-polyglyeryl polystearate (PGPS), polyglyceryl ester of oleic acid (PGPO), polyglyceryl polyoleate (PGPO), polyglyceryl ester of ricinoleic acid (PGPR) polyglyceryl polyricinoleate (PGPR), diglycerides, waxes, wax esters, fatty alcohols, fatty acids, hydroxylated fatty acids, ceramide, lectin, sorbitan tristearate, sphingolipids, sorbitan-tristearate, n-alkanes, phytosterols, sterols esters, ethylcellulose, ciannamic acid, sucrose esters of fatty acids, and mixtures thereof.

The sonicating produces an ultrasound field comprising superpositioned ultrasound waves. According to one embodiment the superpositioned ultrasound waves comprise a standing ultrasound wave pattern. According to another embodiment the superpositioned ultrasound waves comprise a dynamically controllable ultrasound wave pattern. The standing ultrasound wave is suitable for organizing oleogel crystals in planes, whereas the dynamically controllable and thus also changeable ultrasound waves can be used for creating more complex orientation of oleogel crystals. The frequency of the ultrasound is preferably 0.5-20 MHz.

The sonication can be performed with a system comprising one or more transducing means which emit ultrasound comprising one or more superpositioned ultrasound waves. Exemplary and non-limiting systems suitable for the method are shown in FIGS. 3-7B.

Positioning and driving of the one or more transducing means of the system can be optimized using finite element method (FEM) simulation. According to a preferable embodiment the FEM simulation is assisted using a machine learning system comprising e.g. waveform data about the superpositioned ultrasound waves.

The viscosity of the mixture may change upon cooling. This in turn may change the speed of the ultrasound in the mixture and hence affect the wave pattern. Also, the forming oleogel crystals and crystallized structures may modify the wave pattern.

To maintain the desired ultrasound wavefield, the method preferably includes monitoring and controlling the superposed ultrasound waveform pattern during cooling.

Thus, according to a preferable embodiment the method comprises also the following actions:
action 203: monitor the superpositioned ultrasound waves during the cooling, and
action 204: adjust if needed, one or more of: frequency of ultrasound waves, phase of ultrasound waves, amplitude of ultrasound waves.

Monitoring comprises typically following one or more of: frequency of ultrasound waves, phase of ultrasound waves, amplitude of ultrasound waves in an effort to maintain the desired superposition of ultrasound waves. The monitoring can be done by e.g. with an oscilloscope that measures the signal from one or more transducer controlling means. Sound field control in turn, can be done e.g. by a microcontroller preferably incorporating artificial intelligence means which changes the frequency and/or the phase of the ultrasound wave to keep the desired ultrasound pattern. The adjusting can be assisted using a machine learning system comprising e.g. waveform data about the one or more superpositioned ultrasound waves.

According to an exemplary embodiment a transducing means that is used to monitor the wave pattern, is connected to an electronic board that constantly monitors the wave pattern. When the oleogel is forming, the amplitude of the recorded signal usually decreases, and to compensate for this the feedback loop modifies the amplitude and/or the frequency and/or phase of the ultrasound.

Figure 3:
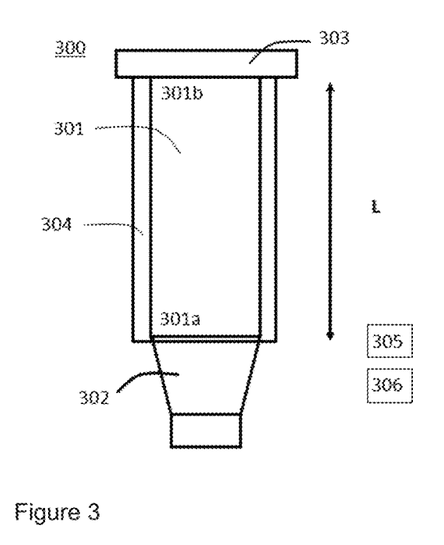
FIGS. 3-6 show exemplary non-limiting systems suitable for use in the method of the present invention.

An exemplary system 300 suitable for the method of the present invention is shown in FIG. 3. The system comprises a chamber 301 for a mixture comprising an oleogelator component and an oil component. The system comprises a first transducing means 302, an acoustic impedance contrast means 303, such as a reflecting boundary, and a temperature reading and controlling means 304. The first transducing means is adapted to emit a succession of ultrasound waves into and through the mixture inside the chamber towards the acoustic impedance contrast means. The frequency of the ultrasound waves is typically 0.5-20 MHz. The emitted and reflected ultrasound produces a superposed ultrasound wave pattern inside the chamber that assists in the orientation of the solidifying, preferably crystallizing the oleogel component, and in creating a distinct pattern of crystallized oleogel inside the mixture upon cooling. An exemplary superposed ultrasound wave pattern is a standing ultrasound wave pattern. The cooling is performed so that the mixture is transferred from a first state wherein the mixture is molten to a state wherein the oleogelator component in the mixture is at least partially, preferably completely, in solid state. The solid state comprises preferably a crystallized oleogelator component.

The chamber of shown in FIG. 3 includes a first end 301a and a second end 301b. The first transducing means 302 is positioned at the first end and a second transducing means an acoustic contrast means 303 is positioned at the second end and opposing the first transducing means. However, the shape of the chamber is not limited to Cartesian forms but also cylindrical, spherical and aspherical forms which allow the formation of superpositioned ultrasound waves in particular standing ultrasound waves can be applied.

The system comprises preferably also means adapted to monitor 305 the superposed ultrasound waveform pattern and means adapted to control 306 the desired superposed ultrasound waveform pattern, in particular during cooling. An exemplary means adapted to monitor the field is an oscilloscope, and an exemplary means adapted to control the field is a microcontroller preferably incorporating an artificial intelligence component that changes frequency or phase of the ultrasound waveform pattern to control and keep a stable resonance. According to an exemplary embodiment, an ultrasound field is generated with a transducing array means that is driven by a feedback loop-controlled signal generating means that is adapted to maintain the superposition wave pattern by adapting to physical changes of the crystallizing oleogel.

Figure 4:
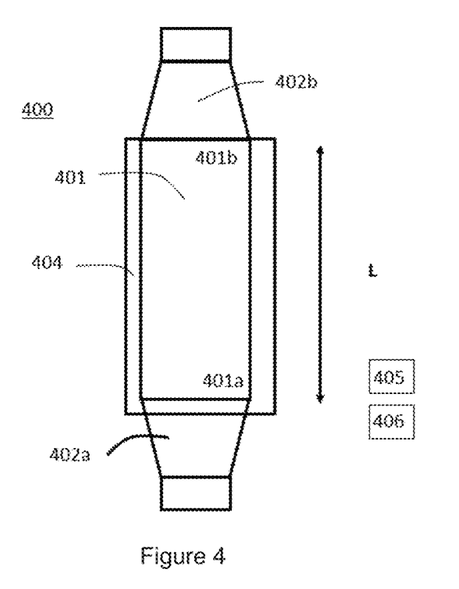

Another exemplary system 400 for the method of the present invention is shown in FIG. 4. The system comprises a chamber 401 that holds a mixture comprising an oleogelator component and an oil component. The system comprises a first transducing means 402a, a second transducing means 402b, and a temperature reading and controlling means 404. The first transducing means and/or the second transducing means is adapted to emit a succession of ultrasound waves to and through the mixture in the chamber. The frequency of the ultrasound waves is preferably 0.5-20 MHz. The shape of the chamber is not limited to Cartesian forms but also cylindrical, spherical and aspherical forms which allow the formation of superpositioned ultrasound waves in particular standing ultrasound waves can be applied.

The emitted ultrasound produces a superposed ultrasound wave pattern into the chamber and assists in orientation of the solidifying, preferably crystallizing oleogel component in the mixture upon cooling. The cooling is performed such that the mixture is transferred from a first state wherein the mixture is in molten to a state wherein the oleogelator component is at least partially, preferably completely, in solid state. The solid state comprises preferably a crystallized oleogelator component. According to a preferable embodiment the solid state consists of crystallized oleogelator component. The system comprises preferably means adapted to monitor 405 superposed ultrasound waveform pattern and means adapted to control 406 the desired superposed ultrasound waveform pattern, in particular during cooling. An exemplary means adapted to monitor is an oscilloscope, and an exemplary means adapted to control/hold is a microcontroller preferably incorporating an artificial intelligence component that changes amplitude and/or frequency and/or phase of the ultrasound waveform pattern to keep stable resonance.

Figure 5:
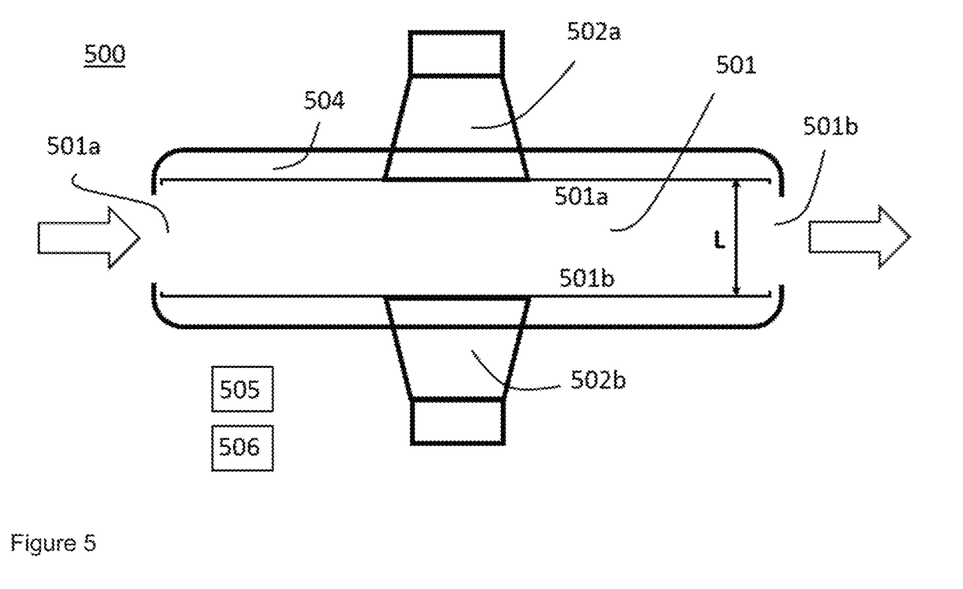

Still another exemplary system 500 for the method of the present invention is shown in FIG. 5. The system comprises a chamber 501 as a tube for holding a mixture comprising an oleogelator component and an oil component for flowing through the tube and a temperature controlling means 504. An exemplary direction of flow is presented in the figure with arrows. The system comprises a first transducing means 502a and a second transducing means 502b. The first transducing means and/or the second transducing means is adapted to emit a succession of ultrasound waves into and through the mixture flowing through the tube. The second transducing means can be replaced with an acoustic impedance contrast means such as a reflector (not shown) adapted to reflect ultrasound towards the first transducing means. The frequency of the ultrasound waves is preferably 0.5-20 MHz. The emitting ultrasound produces a superposed ultrasound wave pattern into the chamber and assist the orientation of the solidifying, preferably crystallizing oleogel component in the mixture. The cooling is performed such that the mixture is transferred from a first state wherein the mixture is in molten to a state wherein the oleogelator component is at least partially, preferably completely, in solid state. The solid state comprises a preferably crystallized oleogelator component. According to a preferable embodiment the solid state consists of crystallized oleogelator component. The system 500 comprises preferably means adapted to monitor 505 superposed ultrasound waveform pattern and means adapted to control/hold 506 the desired superposed ultrasound waveform pattern, in particular during cooling. An exemplary means adapted to monitor is an oscilloscope, and an exemplary means adapted to control/hold is a microcontroller preferably incorporating an artificial intelligence component that changes frequency or phase of the ultrasound waveform pattern to keep stable resonance. The shape of the chamber is not limited to Cartesian forms but also cylindrical, spherical and aspherical forms which allow the formation of superpositioned ultrasound waves in particular standing ultrasound waves can be applied.

The chamber of shown in FIG. 5 includes a first end 501a and a second end 501b. The first transducing means 502a is positioned at the first end and a second transducing means an acoustic contrast means 502b is positioned at the second end and opposing the first transducing means. However, the shape of the chamber is not limited to Cartesian forms but also cylindrical, spherical and aspherical forms which allow the formation of superpositioned ultrasound waves in particular standing ultrasound waves can be applied.

Figure 6:
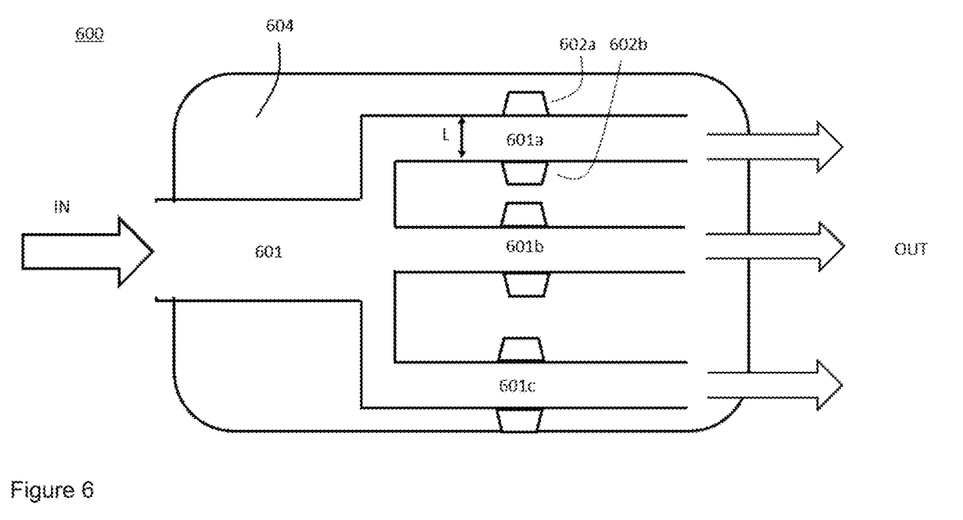

Still another exemplary system 600 for the method of the present invention is shown in FIG. 6. The system comprises an array 601 of chambers i.e. tubes 601a-c for holding a mixture comprising an oleogelator component and an oil component for flowing through the array of tubes. Each tube of the array comprises at least a first transducing means 602a and a second transducing means 602b. Only the transducer means of the first tube is shown in the figure for clarity. The first transducing means and/or the second transducing means is adapted to emit a succession of ultrasound waves into and through the mixture flowing through the tubes. The second transducing means can be replacing with acoustic impedance contrast means such as a reflector (not shown). The frequency of the ultrasound waves is preferably 0.5-20 MHz. The emitted ultrasound produces a field of superposed ultrasound waves into the chamber and assists in orientation of the solidifying, preferably crystallizing oleogel component in the mixture. A more complex field obtained by superposition of several waves allows location dependent orientation of the crystals (desired orientation at desired position). The field can be also a vortex or a double vortex. The system comprises means 604 for reading and controlling the temperature of the mixture within the tubes, and preferably also means adapted to monitor 605 the superposed ultrasound waveform pattern and means adapted to control/hold 606 the desired superposed ultrasound waveform pattern, in particular during cooling. An exemplary means adapted to monitor is an oscilloscope, and an exemplary means adapted to hold is a microcontroller preferably incorporating an artificial intelligence component that changes amplitude and/or frequency and/or phase of the ultrasound waveform pattern to keep/hold/alter the desired ultrasound filed.

The dimensions and shape of a chamber for holding the mixture is preferably designed to favor the formation of the desired ultrasound wave pattern. For example, when the superposed ultrasound waves are standing waves, distance L between the first transducing means and the second transducing means or distance L between the first transducing means and the acoustic impedance contrast means such as a reflector is $n \cdot \lambda$, or $n \cdot \lambda/2$ wherein n is an integer, and $\lambda$ is wavelength of the ultrasound waves in the mixture. The integer n is preferably 40 or less.

The chamber or a section of the chamber can be shaped to comprise rectangular, spherical, cylindrical, exponential horn, logarithmic spiral, and tapered shape form.

According to one embodiment, the method comprises
providing a system 300, 400 comprising
a chamber 301, 401,
a first transducing means 302, 402a and
a second transducing means 402b or an acoustic impedance contrast means 303,
transferring a mixture comprising an oleogelator component and an oil component into the chamber,
cooling the mixture from a first temperature wherein the mixture is in molten state to a second temperature wherein the oleogelator component in the mixture is at least partially in solid state, and
the first transducing means and/or the second transducing means emitting ultrasound comprising one or more superpositions of ultrasound waves for sonicating the mixture in the chamber.

When the superpositioned ultrasound waves comprise a standing ultrasound wave pattern, the distance L between the first transducing means and the second transducing means or distance between the first transducing means and an acoustic impedance contrast means n·λ or n·λ/2, wherein n is an integer, and λ is wavelength of the ultrasound waves in the mixture. The integer n is preferably 40 or less.

According to another embodiment the method comprises providing a system 500 comprising
- a chamber 501 comprising an inlet 501a and an outlet 501b,
- a first transducing means 502a,
- a second transducing means 502b or an acoustic impedance contrast means,
- transferring a mixture comprising an oleogelator component and an oil component to the chamber via the inlet,
- cooling the mixture in the tubing from a first temperature wherein the mixture is at molten state to a second temperature wherein the mixture is at least partially at solid state,
- the first transducing means and/or the second transducing means emitting ultrasound comprising one or more superpositions of ultrasound waves for sonicating the mixture in the chamber, and
- passing the mixture at the second temperature from the chamber via the outlet.

When the superpositioned ultrasound waves comprise a standing ultrasound wave pattern, the distance L between the first transducing means and the second transducing means or distance between the first transducing means and an acoustic impedance contrast means n·λ or n·λ/2, wherein n is an integer, and λ is wavelength of the ultrasound waves in the mixture. The integer n is preferably 40 or less.

According to a preferable embodiment, systems 300, 400, 500, 600 comprise means adapted to monitor the ultrasound waveform pattern and means adapted to control/hold the desired ultrasound waveform pattern, in particular during cooling. An exemplary means adapted to monitor is an oscilloscope, and an exemplary means adapted to control/hold is a microcontroller preferably incorporating an artificial intelligence component that changes amplitude and/or frequency and/or phase of the ultrasound waveform pattern to keep/hold the desired ultrasound filed.

The ultrasound field generated may comprise one or more superpositioned ultrasound waves having the same or different frequency. The field can also be generated by a beat frequency between two waves with the same or different frequencies. The time varying acoustic field is generated by interacting acoustic pulses or longer acoustic bursts that are phase controlled.

According to an exemplary embodiment the ultrasonic waves are generated by planar or focused ceramic or polymeric or silicon transducers, single or phase array ceramic transducers, or by photoacoustic means. The field is generated by linear or non-linear superposition of waves.

The systems disclosed in FIGS. 3-6 are suitable for controlling the orientation of oleogels in 1D. However, orientation of the oleogels in 2D or 3D can be done by appropriate orientation of the transducers around the chamber wherein the method is performed. Exemplary non-limiting transducer orientations are shown in FIGS. 7A and 7B, and on the right-hand side of FIG. 1.

Figure 7A:
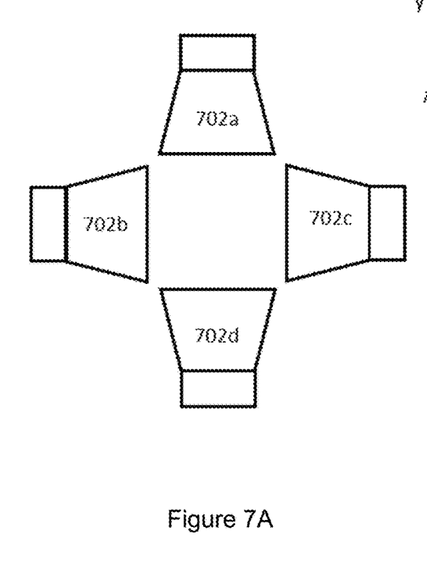
FIGS. 7A and 7B show exemplary non-limiting transducer configurations suitable for use in the method of the present invention for 2D and 3D orientation of oleogelator components.

FIG. 7A shows four transducing means 702a, 702b, 702c, 702d adapted to orient oleogelator components in the x-y-plane of the coordinate system 799 when the oriented oleogelator components are positioned between the transducing means.

Figure 7B:
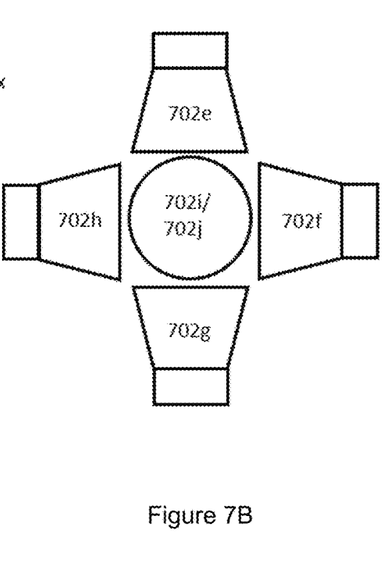

FIG. 7B shows a section view of six transducer means 702e, 702f, 702g, 702h, 702i, 702j adapted to orient oleogelator components in x-y-z space of the coordinate system 799 when the oriented oleogelator components are positioned between the transducing means.

According to one embodiment the transducing means i.e. an ultrasound generating means suitable for the method of the present invention is a transducer comprising piezoelectric ceramics. Such a transducer is a transducer for ultrasonic actuation. The transducer is composed of a stack of piezoelectric disks, clamped between two metallic bars, typically aluminum, titanium or stainless-steel, that feature a front mass and a back mass of the transducer, respectively. As one exemplary embodiment, the length of the front mass and of the back mass of the transducer are tuned so that the transducer behaves as a half-wavelength resonator, i.e. a fundamental standing wave is born along the long axis of the transducer, featuring an antinode at both ends of the transducer.

The scaling up of the method depends on how the oleogel is used. If it is part of a product or is a filling then the ultrasound can be used directly onto the sample i.e. single portions crystallized individually, and ultrasound is preferably applied during crystallization.

If the product is produced continuously, then the ultrasound can be applied onto production the lines or integrated into production lines. In the latter case, the liquid flows into a pipe that is then split into several lines where an array of transducers is mounted on each line. Ultrasound is applied during cooling while the oleogel is translated forward. An exemplary system suitable for this application is shown in FIG. 6.

Figure 8:
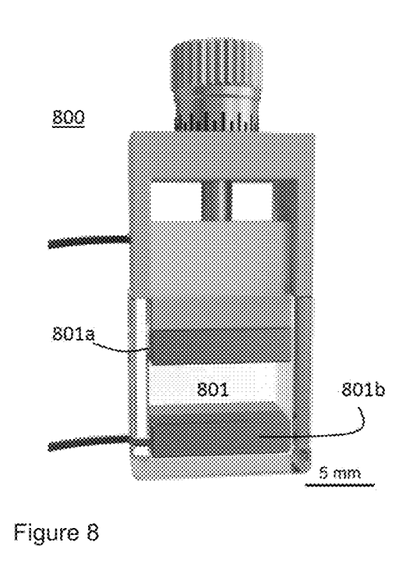
FIG. 8 shows a prototype system suitable for the method of the present invention.
Figure 9:
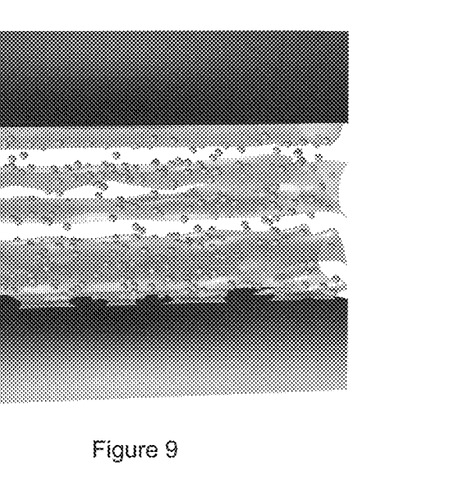
FIG. 9 shows a 3D view of finite element simulation of 100 μm monostearin spherical particles in rapeseed oil subjected to an ultrasonic pattern originated by superposition of 1 MHz ultrasonic waves.
Figure 10:
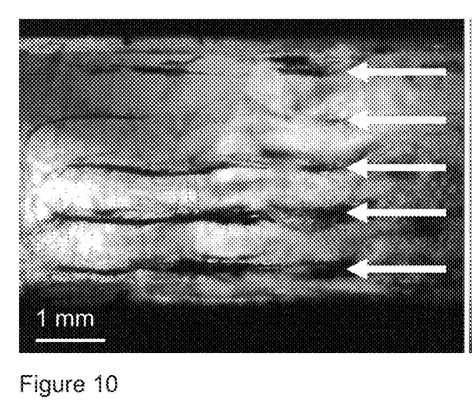
FIG. 10 shows formation of layers of carbon rods in rapeseed oil in the method of the present invention, arrows indicate the formed layers.
Figure 11:
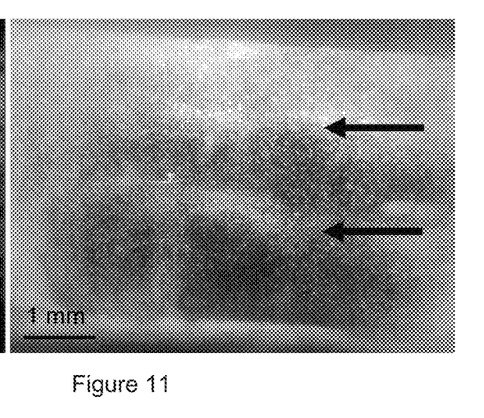
FIG. 11 shows formation of layers composed of oriented monoglyceride crystals in rapeseed oil during cooling in the method of the present invention, arrows indicate the forming layers.

A prototype of a system 800 suitable for the method of the present invention is shown in FIG. 8. The system comprises a chamber 801 for the mixture, a first transducer 801a, and a second transducer 801b. The side walls of the chamber are made of glass so that the crystallization process can be monitored visually. A computer simulation of the ultrasound field generated by superposition of ultrasonic waves in the chamber 801 comprising rapeseed oil and monostearin spherical particles with 100 μm in diameter is shown in FIG. 9. The corresponding "real world" experiments are shown in FIGS. 10 and 11. The oriented carbon rods are marked in FIG. 10 with an arrow. FIG. 11 demonstrates formation of layers of monoglyceride crystals in rapeseed oil during cooling using the system 800 in the method of the present invention.

According to another embodiment the present invention concerns a stabilized oleogel obtainable by a method comprising subjecting a mixture comprising an oleogelator component and an oil component to a succession of ultrasound waves wherein the ultrasound waves create a field of superposed ultrasonic waves According to a particular embodiment the present invention concerns foodstuff such as chocolate comprising oleogel obtainable by the method of the present invention.

According to still another embodiment the present invention concerns a method for increasing stability of an oleogel with an ultrasound field comprising one or more superpositions of ultrasound waves.

EXAMPLES

Materials
Oleogel: 5% (w/w) saturated monoglyceride (Myverol 18-04 K, Kerry) in rapeseed oil.
Dyed oil: rapeseed oil was stained using Red Oil O (Sigma-Aldrich, St. Louis, MO, USA).

Ultrasonic Wave Assisted Crystallization 1 mL of molten oleogel was poured into a preheated modified cuvette. The cuvette was modified by replacing the bottom part with Capton tape. After the molten oleogel was poured into the cuvette, an aluminum reflector (thickness 2.5 mm) was placed above the sample at 1 cm from the bottom. Samples were sonicated at 1.038 MHz (1 MHz) and 1.986 MHz (2 MHz) with an input voltage of 25 V and 10 V before the amplifier respectively, by placing the cuvette on top of a piezoelectric transducing means. To allow transmission of ultrasound between the transducing means and the cuvette, Aquasonic 100 ultrasound transmission gel (Parker Laboratories, Inc., Fairfield, NJ, USA) was used. The oleogel was allowed to cool down. Crystallization initiated between 50° C. and 45° C. Sonication was continued for 5 min after the sample turned opaque. In the case of 1 MHz sonication, a heat sink mounted with a fan was used to dissipate excess heat. After sonication, samples were placed for 30 min at −20° C. and then the reflector was carefully removed to minimize damage of the sample surface. Ultrasonic superposed waves (USW) treated samples were then stored at room temperature for 24 h. Following, 1 mL of dyed oil was added on top of the sample and colorant diffusion was measured for 72 h at regular intervals by means of a caliper.

High Intensity Ultrasound Assisted Crystallization 1 mL of molten oleogel was poured into a preheated cuvette. The sample was sonicated with 20 kHz using a Vibra-Cell high intensity ultrasound (HIU) device operating at 130 W electric power (Sonics & Materials Inc., Newtown, CT, USA) equipped with 3.1 mm tip. The intermittent sonication amplitude was 20% of the maximum amplitude of the HIU equipment with a total treatment time of 15 s and with 1 s on and 1 s off. The cuvette was immersed in a coldwater bath and as soon as the oleogelator started to crystallize (visually determined), HIU was applied. The tip was immersed into the forming oleogel, close to the surface. After crystallization was complete (visually determined), the sample was placed for 30 min at −20° C. and then incubated at room temperature for 24 h before adding 1 mL of dyed oil. After this we started to monitor the colorant diffusion.

Static Crystallization 1 mL of molten oleogel was poured into a preheated cuvette and was left to crystallize at room temperature with the same aluminum reflector as used in the ultrasonic standing wave assisted crystallization experiment. After crystallization occurred, the sample was placed for 30 min at −20° C., the reflector was carefully removed, and the sample was incubated at room temperature for 24 h before adding 1 mL of dyed oil. After this we started to monitor the colorant diffusion.

Sheared 1 mL of molten oleogel was poured into a preheated cuvette. During cooling, the sample was stirred with a spatula. The shearing was applied during the crystallization process and continued for 1 min after the sample turned totally opaque. The sample was then placed for 30 min at −20° C. and incubated at room temperature for 24 h before adding 1 mL of dyed oil. After this we started to monitor the colorant diffusion.

Results

Figure 12:
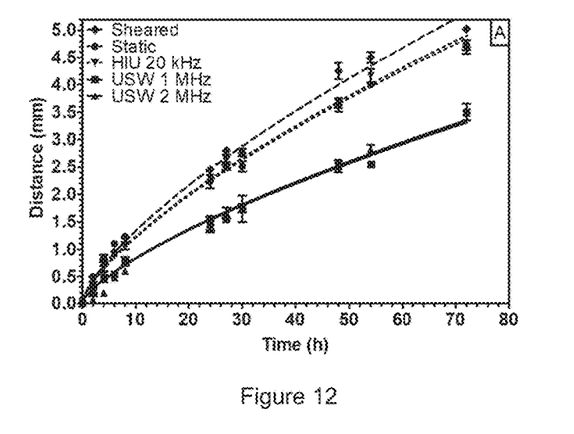
FIG. 12 shows diffusion of a colorant into oleogels treated according to prior art and according to the present invention as a function of time.
Figure 13:
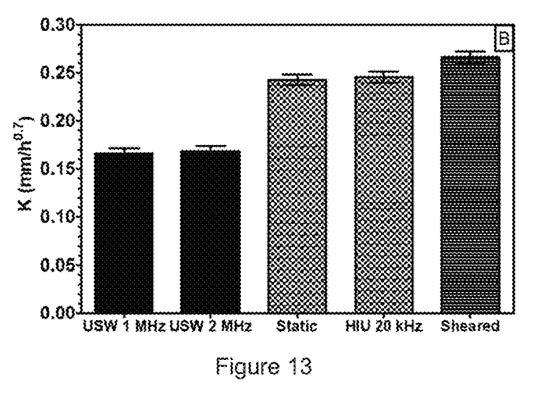
FIG. 13 shows K (mm/h$^{0.7}$) values of oleogels treated according to prior art (static, HIU, sheared) and according to the present invention (USW)
Figure 14:
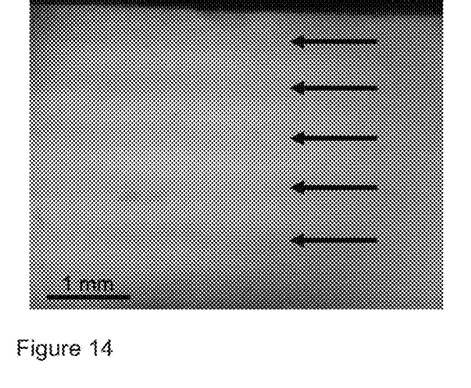
FIG. 14 shows an oleogel containing 5% monoglyceride sonicated at 1 MHz according to a method of the present invention, and FIG. 15 an oleogel containing 5% monoglyceride sonicated at 2 MHz according to a method of the present invention.
Figure 15:
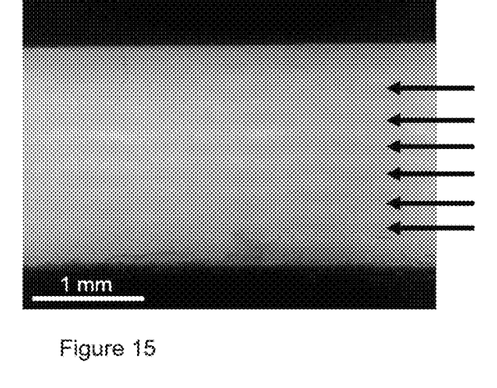

FIG. 12 shows the diffusion of colorant in mm into the oleogel as a function of time for samples statically crystallized, and crystallized under high intensity ultrasound (HIU), shear, and crystallized with the method of the present invention (USW). As seen in this figure, the colorant diffusion is slower in samples treated with the method of the present invention compared to the state-of-the-art technology used to tailor oleogel and fat structures. In the figure, data were fitted using the exponential equation $y=K*x^n$, where y is the distance in mm travelled by the colorant inside the oleogel, K is the diffusion rate constant, x is time, n is the reaction order. After an initial fitting, the reaction order exponent n was fixed to 0.7 since it was the average value for several samples. This allowed us to compare the diffusion rate constant for the different samples. FIG. 13 shows the diffusion rate constants with their confidence interval at 95% (error bars) expressed in $mm/h^{0.7}$ for the corresponding samples shown in FIG. 12. FIG. 13 shows that the method of the present invention retards the diffusion of the colorant inside oleogel samples since K is smaller for USW treated samples compared to the other samples (HIU, static, sheared). This can be due to the formation of layers of oriented crystalline oleogelators. The obtained layers act as physical barriers that allow more stable oleogels to be obtained. As an example, FIGS. 14 and 15 show fully crystallized oleogels treated during crystallization with the method of the present invention at 1 and 2 MHz, respectively. The arrows indicate denser regions of the oleogels which correspond to the layers of crystals formed during cooling which in turn acting as barriers against colorant diffusion.

The specific examples provided in the description given above should not be construed as limiting the scope and/or the applicability of the appended claims.

What is claimed is:

1. A method for producing oleogel, the method comprising
providing a mixture comprising an oleogelator component other than ethylcellulose, and an oil component, and
sonicating the mixture with ultrasound and cooling the mixture from a first temperature wherein the mixture is in molten state to a second temperature wherein the oleogelator component in the mixture is at least partially in solid state and wherein crystallization of the oleogelator component is initiated,
wherein the ultrasound comprises one or more superpositions of ultrasound waves; frequency of the ultrasound is 0.5-20 MHZ; and the ultrasound is generated by a system comprising one or more transducing means emitting ultrasound comprising one or more superpositioned ultrasound waves; thereby forming oleogel comprising oriented crystals of the oleogelator component,
said method further comprising monitoring the one or more superpositions of ultrasound waves and controlling a desired pattern of said one or more superpositions of ultrasound waves during said cooling.

2. The method according to claim 1 wherein the one or more superpositions of ultrasound waves comprise a standing ultrasound wave pattern.

3. The method according to claim 1 wherein the one or more superpositions of ultrasound waves comprise a dynamically controlled ultrasound wave pattern.

4. The method according to claim 1 comprising optimizing positioning of the one or more transducing means and/or optimizing driving of one or more signal of the one or more transducing means by finite element method (FEM) simulation.

5. The method according to claim 4 wherein the optimizing comprises assisting the FEM simulation using a machine learning system.

6. The method according to claim 1 for the monitoring and controlling the desired pattern of said one or more superpositions of ultrasound waves comprising adjusting one or more of: frequency of ultrasound waves, phase of ultrasound waves, amplitude of ultrasound waves.

7. The method according to claim 6 comprising assisting the adjusting using a machine learning system.

8. The method according to claim 1 wherein the oil component is selected from the group consisting of soybean oil, canola oil, corn oil, sunflower oil, safflower oil, flaxseed oil, almond oil, peanut oil, fish oil, algal oil, palm oil, palm stearin, palm olein, palm kernel oil, high oleic soybean/canola/sunflower/safflower oils, hydrogenated palm kernel oil, hydrogenated palm stearin, fully hydrogenated soybean/canola/cottonseed oils, high stearic sunflower oil, enzymatically and chemically inter esterified oils, butter oil, cocoa butter, avocado oil, almond oil, coconut oil, cottonseed oil, mineral oil, silicon oil, fluorinated oil, and mixtures thereof.

9. The method according to claim 1 wherein the oleogelator component is selected from the group consisting of saturated monoglyceride, polyoxyethylene sorbitan monooleate, polyoxyethylene sorbitan monostearate-sorbitan monooleate (SMO), sorbitan monostearate (SMS), glyceryl monooleate (GMO), glyceryl monostearate (GMS), glyceryl monopalmitate (GMP), polyglyceryl ester of lauric acid-polyglyceryl polylaurate (PGPL), polyglyceryl ester of stearic acid-polyglyeryl polystearate (PGPS), polyglyceryl ester of oleic acid (PGPO), polyglyceryl polyoleate (PGPO), polyglyceryl ester of ricinoleic acid (PGPR) polyglyceryl polyricinoleate (PGPR), diglycerides, waxes, wax esters, fatty alcohols, fatty acids, hydroxylated fatty acids, ceramide, lectin, sorbitan tristearate, sphingolipids, n-alkanes, phytosterols, sterols esters, cinnamic acid, sucrose esters of fatty acids, and mixtures thereof.

10. The method according to claim 1, wherein the ultrasound has an intensity of 0.001-10 W $cm^{-2}$.

\* \* \* \* \*